W. M. PHILLIPPIE.
NUT LOCK.
APPLICATION FILED JULY 1, 1913.
1,086,935.
Patented Feb. 10, 1914.
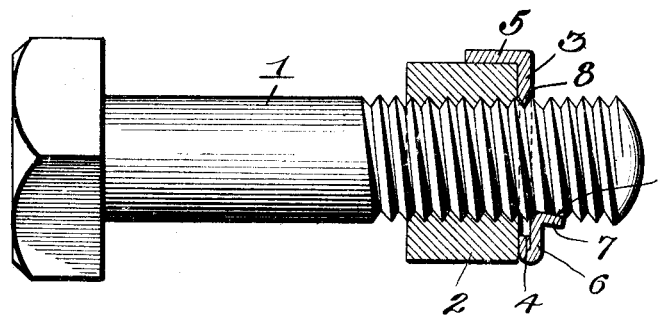
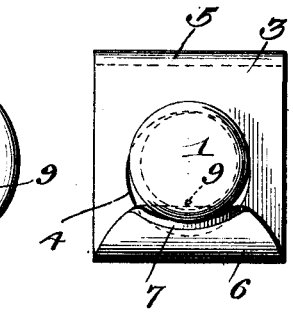
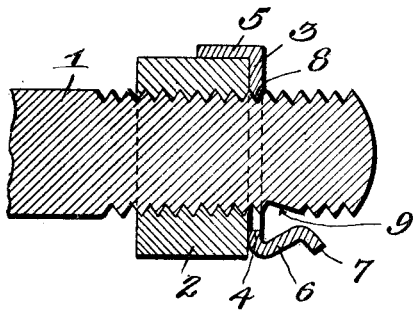
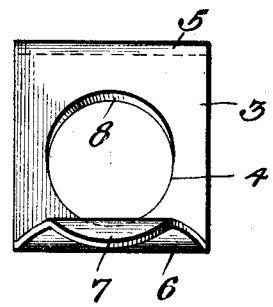
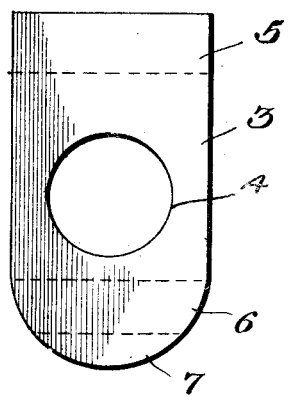
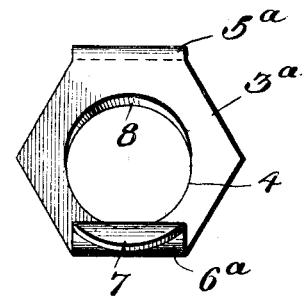
W. M. Phillippie,
INVENTOR
WITNESSES
BY
ATTORNEY

UNITED STATES PATENT OFFICE.

WEBSTER MONROE PHILLIPPIE, OF WINSTON-SALEM, NORTH CAROLINA.

NUT-LOCK.

1,086,935.  Specification of Letters Patent.  Patented Feb. 10, 1914.

Application filed July 1, 1913. Serial No. 776,868.

*To all whom it may concern:*

Be it known that I, WEBSTER M. PHILLIPPIE, a citizen of the United States, residing at Winston-Salem, in the county of Forsyth and State of North Carolina, have invented a new and useful Nut-Lock, of which the following is a specification.

This invention has reference to improvements in nut locks, and its object is to provide a simple, cheap and readily applied locking device for nuts requiring no change in the nut and but a slight modification of the bolt, while the device is readily detached when it is desired to purposely remove the nut.

In accordance with the present invention there is provided a plate of tough material, such as steel, having one edge bent to form a nut engaging flange and the opposite edge bent so that it may be readily forced into an easily constructed notch in the bolt after the nut has been applied, while the plate is provided with a passage for the threaded shank of the bolt and is shaped at the passage with a thread engaging portion preventing any movement of the nut lock lengthwise of the bolt shank.

While for convenience of description the nut lock will be considered as applied to a nut in turn applied to the threaded portion of a bolt, it will be understood that the device is equally applicable to any nut-like structure applied to any threaded member when it is desirable that the nut be held against accidental turning even under the most severe shocks and jars to which it may be subjected in use, and the terms nut and bolt are to be understood as applicable not only to structures specifically described by the terms, but to any like structures where the invention is applicable.

The invention will be best understood from a consideration of the following detailed description, taken in connection with the accompanying drawings forming part of this specification, with the further understanding that while the drawings show a practical form of the invention, the latter is not confined to any strict conformity with the showing of the drawings, but may be changed and modified so long as such changes and modifications fall within the scope of the appended claims.

In the drawings:—Figure 1 is a plan view of a bolt with a nut and the improved nut lock applied thereto, said nut and nut lock being shown in section. Fig. 2 is an end view of the structure of Fig. 1. Fig. 3 is a section lengthwise of the bolt shank and including the nut and nut lock but showing a different position of the parts from that shown in Fig. 1. Fig. 4 is a face view of the nut lock ready for application to the bolt. Fig. 5 is a plan view of a blank from which the nut lock may be formed. Fig. 6 is a view similar to Fig. 4 but showing a slight modification in the form of the nut lock.

Referring to the drawings, there is shown a bolt 1 which may be taken as indicative of any threaded member, and to this bolt, there is applied a nut 2 which may be also taken as indicative of any member of like character.

The nut lock designed to hold the nut 2 on the threaded portion of the bolt 1 against turning, is formed of a plate 3 which may be initially longer than its width, and provided at an intermediate point with a passage 4 of a diameter to permit the plate 3 to slip over the threaded portion of the bolt 1. One end 5 of the plate 3 is bent at an angle to form a lip and is so related to the passage 4 that when the plate 3 is applied to a bolt in a manner to be described, the lip 5 will engage one side of the nut 2. The other end 6 of the plate 3 is bent in a direction the reverse of the lip 5 and has a terminal portion 7 returned upon itself so that there is formed a lip having a reversely curved terminal 7. The extension or lip 6 may be narrowed at 7 as shown in Figs. 2, 4 and 5.

The wall of the passage or opening 4 toward the lip 5 is beveled to form a curved tooth 8 shaped to enter between two adjacent turns of the threaded end of the bolt, but the free opening of the passage 4 is sufficient to permit the placing of the plate 3 on to the nut with the threaded end of the bolt protruding.

When the nut 2 has been screwed on to the bolt to the desired extent, one side of the threaded portion of the bolt is acted upon by a file or cold chisel to form a notch 9 into which the return end 7 of the lip 6 is forced by folding the lip 6 down upon the body portion of the plate in a direction toward the opening 4 or shank of the bolt. This causes the tooth 8 to be lodged in the space between two adjacent turns of the thread of the bolt and the lip 5 is so located with reference to the tooth 8 that under these circumstances it is brought into contact or into operative relation with the adjacent side of the nut.

The position of the parts after the nut lock has been placed upon the shank of the bolt until it rests upon the outer face of the nut with the tooth 8 lodged between two adjacent turns of the thread and before the nut lock is finally secured to the bolt, is shown in Fig. 3, while the final position of the parts is illustrated in Figs. 1 and 2. The lip 6 is readily forced down upon the plate 3 and into the notch 9 by any suitable tool such as a punch, and when once in such position no force less than one destructive to the parts is sufficient to turn the nut on the bolt, wherefore the nut is securely locked in place and cannot accidentally loosen. Suppose, however, that it is desired to remove the nut, then a chisel or other tool forced between the lip 6 and the shank of the bolt readily bends the lip 6 away from the bolt sufficiently to permit the removal of the plate 3 from the nut, whereupon the latter may be removed at will.

When the lip 6 is forced into its seat in the notch 9 any means, such as a clamp or a wrench, is applied to the nut 2 so as to hold the lip 5 tight against the corresponding side of the nut, thus permitting the bending of the lip 6 into position without at the same time dislodging the tooth 8 from its seat between two adjacent turns of the threaded portion of the bolt.

The structure shown in Figs. 1 to 5 is that adapted to square nuts, while the nut shown in Fig. 6 is one adapted to hexagonal nuts, in which case there is a plate 3ª of generally hexagonal form having lips 5ª and 6ª, the latter being provided with a terminal portion 7 like that of the other form and the plate 3ª having an opening 4 with a marginal tooth 8 on one side as in the other form. The operation of the structure shown in Fig. 6 is the same as that shown in the other figures.

What is claimed is:—

1. A nut lock comprising a plate having lips at opposite ends projecting from respectively opposite faces of the plate, each at an angle thereto, and said plate having a passage intermediate of the lips and of a size to permit the plate to be slipped over the threaded shank of a bolt and to then be moved laterally with respect to the longitudinal axis of the bolt, said passage being formed on the side toward one of the lips with a tooth adapted to lodge between adjacent turns of the threaded end of the bolt.

2. A nut lock comprising a plate adapted to one face of a nut, said plate having one end bent at an angle to engage the corresponding side of an applied nut and the other end also bent at an angle from the face of the plate remote from that with respect to which the first-named end is bent and the second-named end having a reversely bent continuation, and said plate being provided with an intermediate passage for the threaded end of a bolt with a tooth at the margins of the passage directed toward the center thereof and shaped to enter between adjacent turns of the threaded end of the bolt to which the nut lock is applied.

3. The combination with a bolt and nut threaded thereon, of a nut lock comprising a plate having a passage therethrough and adapted to be passed on to the threaded end of the bolt into engagement with the nut, one end of the plate being turned to form an angle lip adapted to engage the corresponding side of the nut, and the passage having an inwardly directed tooth shaped to enter between adjacent threads of the threaded end of the bolt, the other end of the plate being bent into a lip projecting in a direction opposite to the first-named lip and terminating in a return portion, and the threaded end of the bolt being formed with a notch or seat adapted to receive the return portion of the last-named lip when the latter is folded down upon the plate.

In testimony, that I claim the foregoing as my own, I have hereto affixed my signature in the presence of two witnesses.

WEBSTER MONROE PHILLIPPIE.

Witnesses:
LEONARD FOSTER,
EDDIE NEWKIRK.